United States Patent [19]

Martin et al.

[11] 4,274,789
[45] Jun. 23, 1981

[54] MECHANISM FOR LOADING AND UNLOADING PALLETS FROM VANS

[75] Inventors: John C. Martin, Toronto; William C. McKee, Willowdale, both of Canada

[73] Assignee: Diesel Equipment Limited, Toronto, Canada

[21] Appl. No.: 27,864

[22] Filed: Apr. 6, 1979

[51] Int. Cl.³ .............................................. B60P 3/00
[52] U.S. Cl. .................................... 414/501; 414/542
[58] Field of Search ............... 414/501, 540, 499, 525

[56] References Cited

U.S. PATENT DOCUMENTS

| | | | |
|---|---|---|---|
| 2,521,727 | 9/1950 | Kappen | 414/525 |
| 2,534,057 | 12/1950 | Pride | 414/501 |
| 3,295,881 | 1/1967 | Worthington | 414/352 |
| 3,833,139 | 9/1974 | Mahoney | 414/501 |

Primary Examiner—Leslie J. Paperner
Assistant Examiner—Lawrence E. Williams

Attorney, Agent, or Firm—Fetherstonhaugh & Co.

[57] ABSTRACT

A pallet loader particularly suitable for use in loading pallets onto a truck comprises a guide structure mounted at the loading end of the truck and a slide frame slidably mounted in the guide structure and an elevator mechanism mounted at one end of the slide frame. The slide member is slidably mounted on the guide structure for movement between an extended position in which the elevator mechanism is disposed outwardly from the loading end of the truck and a retracted position in which the elevator mechanism is disposed in an overlying relationship with respect to the bed of the truck. The elevator mechanism is operable when the slide frame is in the extended position to engage and raise and lower unattached load units. The slide frame is provided with a drive mechanism for driving it longitudinally of the frame so as to move palletized load units carried thereby longitudinally onto and off of the loading end of the truck.

13 Claims, 9 Drawing Figures

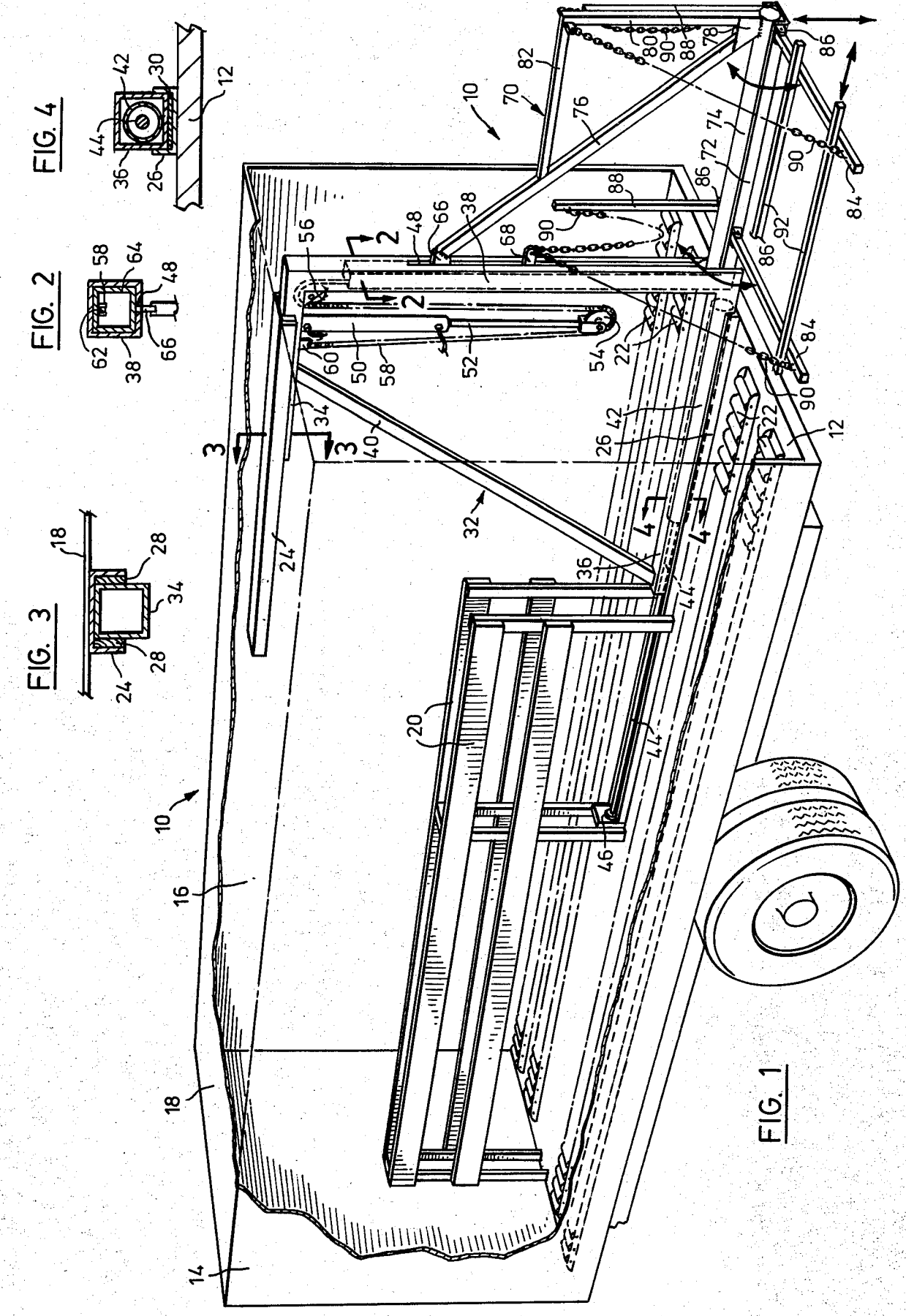

MECHANISM FOR LOADING AND UNLOADING PALLETS FROM VANS

FIELD OF INVENTION

This invention relates to pallet loaders. In particular, this invention relates to a pallet loader which is mountable in a truck so as to load and unload palletized load units therefrom.

PRIOR ART

It is common practice to arrange shipping loads on pallets so that they may be easily loaded onto a truck using a fork lift truck. Where fork lift trucks are available as, for example, in a bottling plant, no difficulty is experienced in loading and unloading palletized loads to and from the truck. At many other locations where the palletized load units are to be unloaded from a truck, the fork lift trucks are not available with the result that considerable difficulty is experienced in attempting to unload the trucks. Elevating platforms have been provided at the back end of a truck to permit load units to be raised and lowered between ground level and the level of the load supporting bed of the truck. With these platforms difficulty is, however, experienced in moving the load longitudinally onto the platform.

The pallet loading device of the present invention overcomes the difficulties of the prior art described above and provides a simple and efficient mechanism which greatly facilitates the elevation and longitudinal movement of palletized load units.

SUMMARY OF THE INVENTION

According to one aspect of the present invention, a pallet loader comprises guide means defining a longitudinally elongated guide path extending in a first generally horizontal plane, slide means slidably mounted on said guide means for longitudinal movement along said guide path between a first position in which a portion thereof is disposed at an elevating station, and a second position spaced longitudinally from said first position, elevator means mounted on said slide means so as to be disposed in said elevator station when said slide means is located in said first position, said elevator means being movable with respect to said slide member when in said elevator station between an elevated position and a lowered position, said elevator means including load engaging means for releasably engaging a palletized load to permit raising and lowering of the pallet load, drive means including means for driving said elevator means to raise and lower a palletized load and means for driving said slide member between said first and second positions so as to move a palletized load into and out of said elevator station.

According to a further aspect of the present invention, there is provided in a truck having a load supporting bed on which palletized loads are to be loaded over one edge thereof, a pallet loader comprising guide means mounted on the truck and defining a longitudinally elongated guide path extending inwardly from said one edge, slide means slidably mounted on said guide means for longitudinal movement along said guide path between a first position and a second position, elevator means including load engaging means for releasably engaging a palletized load unit, said elevator means being slidably mounted on said slide means for movement of said load engaging means between a lowered position and an elevated position, drive means including means for driving said slide means between said first and second positions and means for driving said elevator means between said elevated position and said lowered position, said first position of said slide means being one in which said elevator means is located outwardly from said one edge so as to be free to move between said elevated position and said lowered position, said second position of said slide means being one in which said load engaging means of said elevator means is disposed above said load supporting bed so as to be lowered onto or raised from said load supporting bed as required.

PREFERRED EMBODIMENT

The invention will be more clearly understood after reference to the following detailed specification read in conjunction with the drawings wherein, FIG. 1 is a pictorial view of a truck body having a pallet loader constructed in accordance with an embodiment of the present invention mounted thereon;

FIG. 2 is a sectional view taken along the line 2—2 of FIG. 1;

FIG. 3 is a sectional view taken along the line 3—3 of FIG. 1;

FIG. 4 is a sectional view taken along the line 4—4 of FIG. 1;

Figure 5:
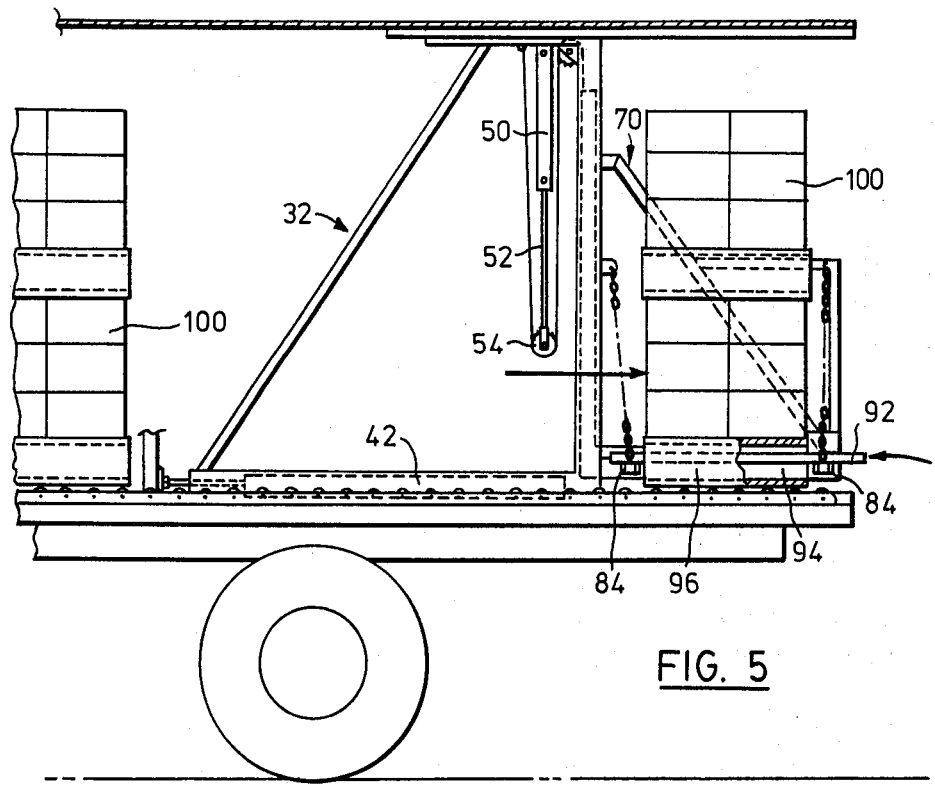
FIG. 5 is a side view of the truck body of FIG. 1 showing the pallet loader in a retracted position.

With reference to FIG. 1 of the drawings, the reference numeral 10 refers generally to the container body of a truck which includes a load supporting bed 12, a pair of oppositely disposed side walls 14 and 16 and a top wall 18. The container space within the container body is divided into two compartments by the divider wall structure 20. Each compartment has a pair of roller conveyors 22, or other load transporting means, extending longitudinally thereof to facilitate the movement of palletized loads therealong. The divider and roller conveyors of this particular construction have been used previously in trucks designed to carry palletized loads and are therefore not described in detail.

A pallet loader 11 is located at the rear end of the load supporting bed 12 of the truck and serves to load and unload palletized load units from the truck. The pallet loader 11 has guide means in the form of an upper guide rail 24 and a lower guide rail 26 which define a longitudinally elongated guide path extending longitudinally of the container body centrally of the width thereof in alignment with the divider 20. As shown in FIG. 3, the upper guide rail 24 is in the form of an inverted U-shaped channel member having wear inserts 28 coextensive with the oppositely disposed side walls of the upper guide rail 24. As shown in FIG. 4 of the drawings, the lower guide rail 26 has a wear insert 30 extensive with the lower wall thereof. The wear inserts 28 and 30 may be made from wood, bronze or any suitable plastic material.

Slide means in the form of a slide frame 32 is mounted in the guide rails 24 and 26 for longitudinal movement along the guide path between the extended position shown in FIG. 1 of the drawings and the retracted position shown in FIG. 5 of the drawings. The slide frame 32 consists of an upper arm 34, a lower arm 36, a vertically oriented guide post 38 and an angularly inclined brace 40. The upper arm 34 and lower arm 36 are slidably mounted in the upper guide rail 24 and lower guide rail 26 as illustrated in FIGS. 3 and 4 of the drawings. An hydraulic cylinder 42 is housed within the lower arm 36 and has one end secured with respect to the arm 36. A ram 44 projects outwardly from the hydraulic cylinder 42 and has its outer end secured to a bracket 46 which is in turn secured with respect to the load supporting bed 12 of the truck. Thus, by activating the hydraulic cylinder 42, the slide frame 32 can be driven along the guide path between the extended position shown in FIG. 1 of the drawings and the retracted position shown in FIG. 5 of the drawings.

As shown in FIGS. 1 and 2 of the drawings, the guide post 38 has a hollow square-shaped cross section and an elongated slot 48 extends upwardly from the lower end of the outer face thereof. A second hydraulic cylinder 50 has one end secured with respect to the upper arm 34 of the slide member. A ram 52 projects outwardly from the other end of the hydraulic cylinder 50 and is movable from the extended position shown in FIG. 1 of the drawings to a retracted position with respect to the hydraulic cylinder 50. A sprocket 54 is located at the outer end of the ram 52. A similar sprocket 56 is mounted for rotation adjacent the upper corner of the slide frame 32. A chain 58 has one end secured to a bracket 60 mounted on the upper arm 34. The chain extends downwardly from the bracket 60 around sprocket 54 and upwardly therefrom around sprocket 56 and enters the hollow cavity formed within the post 48 to be connected as shown in FIG. 2 of the drawings to a flange 62 which projects inwardly from the elevator post 64. The elevator frame is generally identified by the reference numeral 70 and includes an elevator post 64 which is slidably mounted in the vertically oriented guide post 38 of the slide frame. The elevator post 64 has a first flange 66 and a second flange 68 which project through the elongated slot 48 in the slide post 38. A U-shaped channel member 72 projects outwardly from the lower end of the post 64 and it will be noted that the elongated passage 48 is enlarged at its lower end to accommodate the channel 72 when the elevator frame 70 is in the raised position. A tubular torque reinforcing member 74 is mounted in the channel shaped member 72 and connected at its inner end to the post 64 and connected at various points along its length to the channel member 72 as by welding or the like. The tubular member 74 improves the torque loading characteristics of the U-shaped channel member 72. A brace 76 has its upper end welded to the flange 66 and its lower end welded to a flange 78 which is in turn welded to the outer end of the torque member 74. An upright frame member 80 projects upwardly from the outer end of the torque member 74 and has its lower end welded to the flanges 78 and its upper end welded to a horizontally extended brace 82.

A first pair of pallet support arms 84 are pivotally mounted on bracket 86 located on one side of the elevator frame 70 and a second pair of support arms 88 are pivotally mounted on similar brackets 86 projecting outwardly from the opposite side of the support frame 70. The arms 88 and 84 are pivotal about the support brackets 86 between a position extending horizontally outwardly from the lower end of the elevator frame and a position extending vertically upwardly from the lower end of the elevator frame. Chains 90 extend between the outer ends of the arms 84, 88 and the elevator frame 70 so as to be taut when the arms 84, 88 are in the horizontal position thereby to provide support for the arms in this position to enable the arms to support the weight of a palletized load. A pair of support bars 92 are provided for use in association with each pair of support arms 84, 88 and have a sufficient length to extend longitudinally therebetween.

When a truck incorporating the pallet loading mechanism of the present invention is to be loaded, the loading may be effected by using a conventional fork lift truck. When the truck of the present invention is to be loaded in this manner, the pallet loader is stowed in the retracted position which is the position shown in FIG. 5 with the exception that the arms 84 and 88 would be located in the upright position, thereby providing clear access to the load storing compartments of the truck container body. Thus, a fork lift truck may be used to load a plurality of palletized load units 100 onto the container body.

Figure 6:
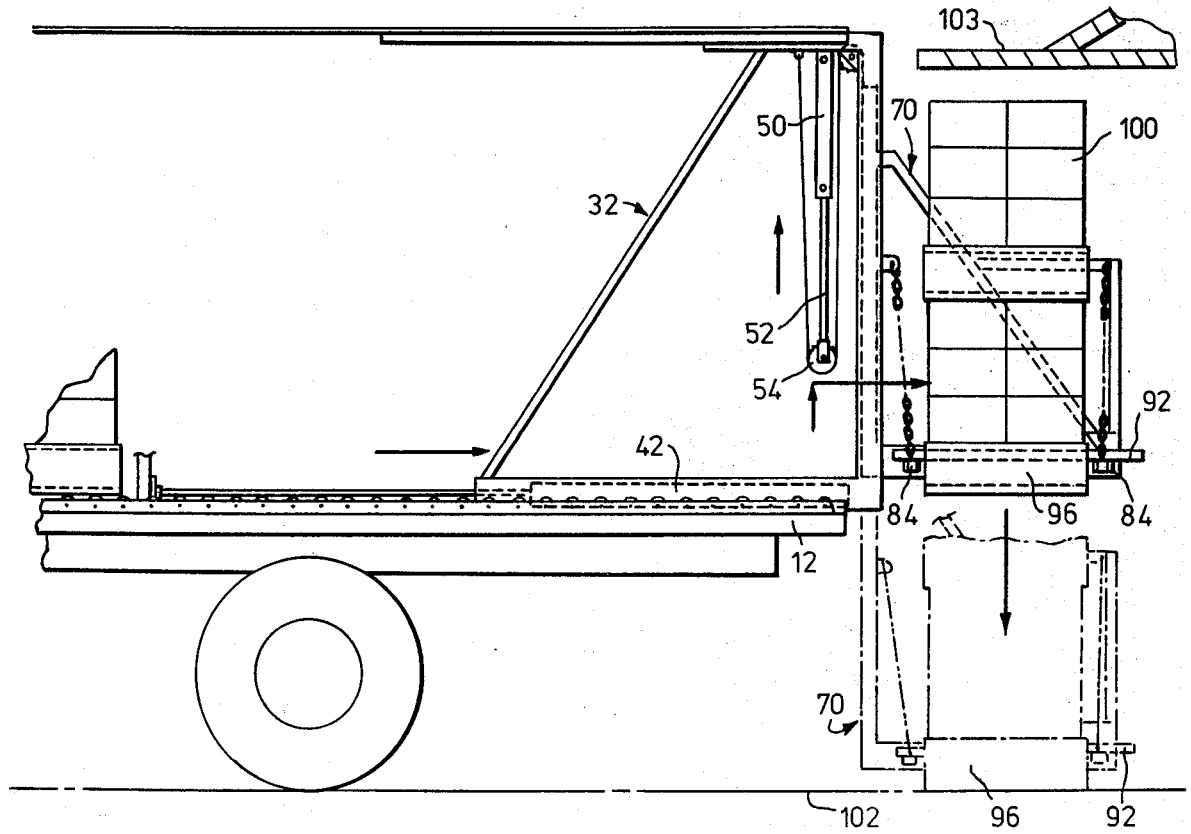
FIG. 6 is a side view similar to FIG. 5 showing the pallet loader in the extended position and illustrating its lowered position in broken lines.

When it is necessary to unload a palletized load unit 100 the operator positions the palletized load so that it is located between the arms 84 when in the raised position, thereafter the arms 84 are lowered to the position shown in FIG. 5 of the drawings. It will be noted that the arms 84 are spaced from one another a distance which is greater than the length of the palletized load 100. This permits the arms to be pivoted between the raised and the lowered positions when the palletized load unit is in position on the container body. After the arms 84 are lowered support bars 92 are positioned to extend through the elongated passages 94 of the pallet 96. Opposite ends of the support bars 92 rest on the arms 84. The hydraulic cylinder 50 is then activated to raise the elevator frame 70 slightly to raise the support bars 92 into engagement with the pallet 96 to take the weight of the palletized load 100. The hydraulic cylinder 42 is then activated to move the slide frame 32 from the retracted position shown in FIG. 5 to the extended position shown in FIG. 6 wherein the elevator frame 70 is located outwardly from the rear end of the bed 12 of the truck. The hydraulic cylinder 50 is again activated to retract the ram 52 thereby to lower the elevator frame 70 to the position shown in broken lines in FIG. 6 in which the pallet 96 rests on the ground 102. The elevator frame 70 is lowered to a sufficient extent to permit the full weight of the palletized load 100 to be supported by the ground, thus permitting the support bars 92 to be withdrawn from the pallet 96. While the support bars 92 are withdrawn the elevator frame 70 may then be returned to its elevated position and thereafter the slide frame 32 may be returned to its retracted position. A second palletized load unit may then be moved along the roller conveyors 22 to a position shown in FIG. 5 of the drawings and the unloading process may then be repeated as described above to unload a second palletized load unit. It will be noted that palletized load units may be simultaneously unloaded from both sides of the container body by the simultaneous use of the second pair of support arms 88. In many instances, it is necessary for a truck of the type described to unload palletized load units under an overhanging canopy of a door or the like. The elevator frame constructed in accordance with the embodiment illustrated in FIGS. 1 to 6 of the drawings is particularly suitable for use in such an application because it does not include any super structure projecting a significant distance from the upper end thereof which might interfere with an overhanging canopy 102 or the like (FIG. 6). It will be apparent that the truck may be loaded with load units by reversing the procedure outlined above in circumstances where a fork lift truck is not available.

Figure 7:
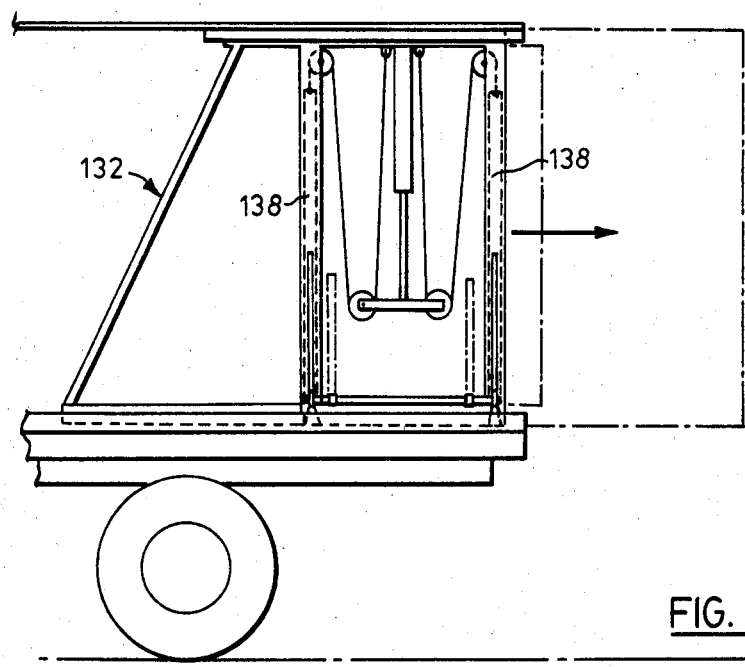
FIG. 7 is a side view similar to FIG. 5 illustrating a pallet loader constructed in accordance with a further embodiment of the present invention.
Figure 8:
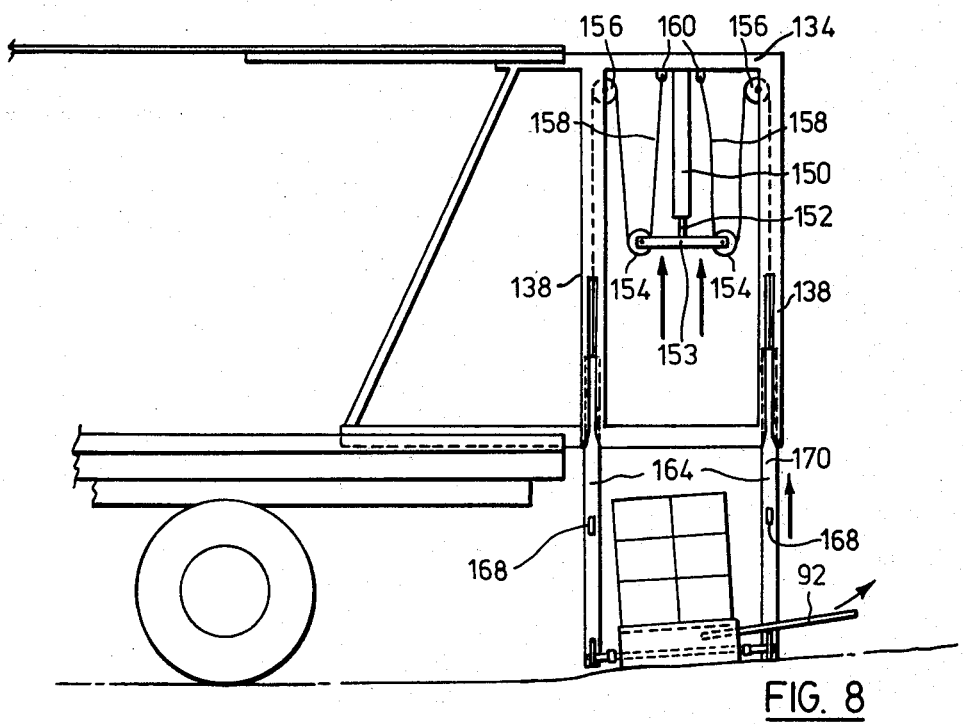
FIG. 8 is a side view similar to FIG. 7 showing the pallet loader in a lowered position.
Figure 9:
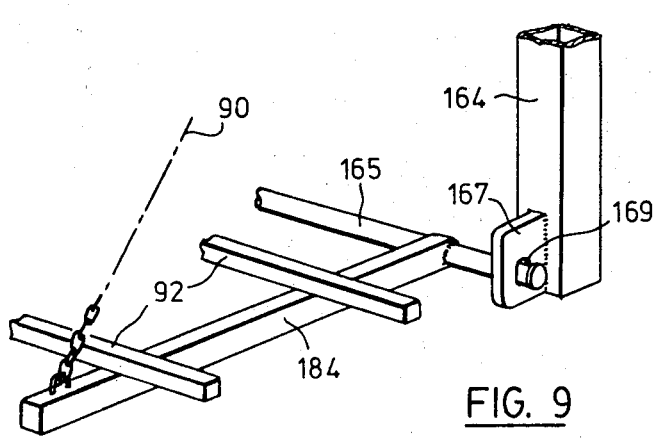
FIG. 9 is an enlarged detailed view illustrating the manner in which a support arm of the pallet loader is pivoted on its frame.

Various modifications of the apparatus of the present invention will be apparent to those skilled in the art. One such modification is illustrated in FIGS. 7 and 8 of the drawings wherein the slide frame 132 has two vertically oriented support posts 138 arranged in a spaced parallel relationship and the elevator frame 170 has two vertically oriented posts 164 slidably mounted in the support posts 138. The support posts 164 of the elevator mechanism are connected at their lower end by a bar 165 which is mounted in flanges 167 located at the lower end of the posts 164. The flanges 167 have elongated slots 169 therein which permits limited movement of the bars 165. The support arms 184 are mounted on a bar 165 and project outwardly therefrom. The elevator drive mechanism includes an hydraulic cylinder 150 which has a ram 152 at the outer end of which a frame 153 is located. Sprockets 154 are mounted at each end of the frame 153 and sprockets 156 are located adjacent the upper corners of the slide frame 138. Chains 158 extend from brackets 160 mounted on the upper frame arm 134 around the sprockets 154 and the sprockets 156 and are connected to the upper ends of the posts 164.

It will be noted that when the elevator frame 170 is lowered onto uneven ground, the elongated slots 169 permit one of the posts 164 to extend below the other post 164. This facilitates the release of the support bars 92 when the palletized load is lowered onto uneven ground.

In another modification, the chain 58 may be eliminated by mounting a direct lifting ram within the guide post 38 with one end secured with respect to the upper end of the guide post 38 and the other end secured to the elevator post 64 so that by extending and retracting the ram, the post 64 may be raised or lowered as required. This arrangement operates in a manner similar to that in which the hydraulic cylinder 42 operates to extend and retract the slide frame 32.

From the foregoing it will be apparent that the pallet loader of the present invention provides a simple and efficient mechanism which greatly facilitates the elevation and longitudinal movement of palletized load units. It has been found that this mechanism is particularly suitable for use in the loading and unloading of trucks for transporting palletized loads such as pop containers and the like. These and other advantages of the apparatus of the present invention will be apparent to those skilled in the art.

What we claim as our invention is:

1. A pallet loader comprising:
   (a) guide means defining a longitudinally elongated guide path extending in a first generally horizontal plane,
   (b) slide means comprising a vertically oriented guide post and means slidably supporting said post on said guide means for laterally restrained longitudinal movement along said guide path between a first position in which a said post is disposed at an elevating station, and a second position spaced longitudinally from said first position, said post being adapted to provide a vertically oriented slipway,
   (c) elevator means mounted on said post so as to be disposed in said elevator station when said slide means is located in said first position, said elevator means comprising an elevator post slidably mounted in said slipway for laterally restrained vertical movement relative to said guide post when in said elevator station between an elevated position and a lowered position, and load engaging means mounted on said elevator post and arranged to releasably engage a palletized load to permit raising and lowering of the pallet load,
   (d) drive means including means for raising and lowering said elevator post to raise and lower a palletized load and means for driving said slide member between said first and second positions so as to move a palletized load into and out of said elevator station.

2. A pallet loader as claimed in claim 1 wherein said load engaging means includes a pair of arms each having an inner end pivotally mounted on said elevator means for movement between a first position extending generally vertically from said pivotally mounted inner end to a second position projecting laterally from said pivotally mounted inner end, said arms being spaced from one another a distance to permit movement between said first and second positions when a palletized load is located therebetween.

3. A pallet loader as claimed in claim 1 wherein said load engaging means includes,
   (a) a first pair of arms each having an inner end pivotally mounted on said elevator means for movement between a first position extending generally vertically from said pivotally mounted inner ends to a second position projecting laterally from said pivotably mounted inner ends, said first arms projecting laterally from a first side of said elevator means and being spaced from one another a distance to permit movement between said first and second positions when a palletized load is located therebetween,
   (b) a second pair of arms each having an inner end pivotally mounted on said elevator means for movement from a first position extending generally vertically from said pivotally mounted inner ends to a second position projecting laterally from said pivotably mounted inner ends, said second pair of arms extending laterally from a second side of said elevator means opposite said first side and being spaced from one another a distance to permit movement between said first and second positions when a palletized load is located therebetween.

4. In a truck having a load supporting bed on which palletized loads are to be loaded over one edge thereof, a pallet loader comprising;
   (a) guide means mounted on the truck and defining a longitudinally elongated guide path extending inwardly from said one edge,
   (b) a slide frame comprising a vertically oriented post and means slidably supporting said post on said guide means for laterally restrained longitudinal movement along said guide path between a first position and a second position, said post being adapted to provide a vertically oriented slipway,
   (c) elevator means comprising an elevator post slidably mounted in said slipway for laterally restrained vertical movement relative to said guide post and load engaging means mounted on said elevator post and arranged to releasably engage a palletized load unit,
(d) drive means including means for driving said slide frame between said first and second positions and means for driving said elevator means between said elevated position and said lowered position,
(e) said first position of said slide frame being one in which said elevator means is located outwardly from said one edge so as to be free to move between said elevated position and said lowered position, said second position of said slide frame being one in which said load engaging means of said elevator means is disposed above said load supporting bed so as to be lowered onto or raised from said load supporting bed as required.

5. A truck as claimed in claim 4 wherein said load engaging means includes a pair of arms each having an inner end pivotally mounted on said elevator means for movement between a first position extending generally vertically from said pivotally mounted inner end to a second position projecting laterally from said pivotally mounted inner end, said arms being spaced from one another a distance to permit movement between said first and second positions when a palletized load is located therebetween.

6. A truck as claimed in claim 4 wherein said load engaging means includes;
(a) a first pair of arms each having an inner end pivotally mounted on said elevator means for movement between a first position extending generally vertically from said pivotally mounted inner ends to a second position projecting laterally from said pivotably mounted inner ends, said first arms projecting laterally from a first side of said elevator means and being spaced from one another a distance to permit movement between said first and second positions when a palletized load is located therebetween,
(b) a second pair of arms each having an inner end pivotally mounted on said elevator means for movement from a first position extending generally vertically from said pivotally mounted inner ends to a second position projecting laterally from said pivotably mounted inner ends, said second pair of arms extending laterally from a second side of said elevator means opposite said first side and being spaced from one another a distance to permit movement between said first and second positions when a palletized load is located therebetween.

7. A truck as claimed in claim 4 wherein said guide means is located centrally of the width of the load supporting bed whereby load supporting compartments are located one on either side of said guide path.

8. A truck as claimed in claim 7 wherein said load engaging means includes;
(a) a first pair of arms each having an inner end pivotally mounted on said elevator means for movement between a first position extending generally vertically from said pivotally mounted inner ends to a second position projecting laterally from said pivotably mounted inner ends, said first arms projecting laterally from a first side of said elevator means and being spaced from one another a distance to permit movement between said first and second positions when a palletized load is located therebetween,
(b) a second pair of arms each having an inner end pivotally mounted on said elevator means for movement from a first position extending generally vertically from said pivotally mounted inner ends to a second position projecting laterally from said pivotably mounted inner ends, said second pair of arms extending laterally from a second side of said elevator means opposite said first said side and being spaced from one another a distance to permit movement between said first and second positions when a palletized load is located therebetween.

9. A pallet loader comprising;
(a) guide means defining a longitudinally elongated guide path extending in a first generally horizontal plane,
(b) slide means slidably mounted on said guide means for longitudinal movement along said guide path between a first position in which a portion thereof is disposed at an elevating station, and a second position spaced longitudinally from said first position,
(c) elevator means mounted on said slide means so as to be disposed in said elevator station when said slide means is located in said first position, said elevator means being movable with respect to said slide member when in said elevator station between an elevated position and a lowered position, said elevator means including load engaging means for releasably engaging a palletized load to permit raising and lowering of the pallet load,
(d) drive means including means for driving said elevator means to raise and lower a palletized load and means for driving said slide member between said first and second positions so as to move a palletized load into and out of said elevator station,
(e) said load engaging means including a pair of arms each having an inner end pivotally mounted on said elevator means for movement between a first position extending generally vertically from said pivotally mounted inner end to a second position projecting laterally from said pivotally mounted inner end, said arms being spaced from one another a distance to permit movement between said first and second positions when a palletized load is located therebetween.

10. A pallet loader comprising;
(a) guide means defining a longitudinally elongated guide path extending in a first generally horizontal plane,
(b) slide means slidably mounted on said guide means for longitudinal movement along said guide path between a first position in which a portion thereof is disposed at an elevating station, and a second position spaced longitudinally from said first position,
(c) elevator means mounted on said slide means so as to be disposed in said elevator station when said slide means is located in said first position, said elevator means being movable with respect to said slide member when in said elevator station between an elevated position and a lowered position, said elevator means including load engaging means for releasably engaging a palletized load to permit raising and lowering of the pallet load,
(d) drive means including means for driving said elevator means to raise and lower a palletized load and means for driving said slide member between said first and second positions so as to move a palletized load into and out of said elevator station,
(e) wherein said load engaging means includes,
(i) a first pair of arms each having an inner end pivotally mounted on said elevator means for movement between a first position extending generally vertically from said pivotally mounted inner ends to a second position projecting laterally from said pivotably mounted inner ends, said first arms projecting laterally from a first side of said elevator means and being spaced from one another a distance to permit movement between said first and second positions when a palletized load is located therebetween,
(ii) a second pair of arms each having an inner end pivotally mounted on said elevator means for movement from a first position extending generally vertically from said pivotally mounted inner ends to a second position projecting laterally from said pivotably mounted inner ends, said second pair of arms extending laterally from a second side of said elevator means opposite said first side and being spaced from one another a distance to permit movement between said first and second positions when a palletized load is located therebetween.

11. In a truck having a load supporting bed on which palletized loads are to be loaded over one edge thereof, a pallet loader comprising;
(a) guide means mounted on the truck and defining a longitudinally elongated guide path extending inwardly from said one edge,
(b) slide means slidably mounted on said guide means for longitudinal movement along said guide path between a first position and a second position,
(c) elevator means including load engaging means for releasably engaging a palletized load unit, said elevator means being slidably mounted on said slide means for movement of said load engaging means between a lowered position and an elevated position,
(d) drive means including means for driving said slide means between said first and second positions and means for driving said elevator means between said elevated position and said lowered position,
(e) said first position of said slide means being one in which said elevator means is located outwardly from said one edge so as to be free to move between said elevated position and said lowered position, said second position of said slide means being one in which said load engaging means of said elevator means is disposed above said load supporting bed so as to be lowered onto or raised from said load supporting bed as required,
(f) said load engaging means including a pair of arms each having an inner end pivotally mounted on said elevator means for movement between a first position extending generally vertically from said pivotally mounted inner end to a second position projecting laterally from said pivotally mounted inner end, said arms being spaced from one another a distance to permit movement between said first and second positions when a palletized load is located therebetween.

12. In a truck having a load supporting bed on which palletized loads are to be loaded over one edge thereof, a pallet loader comprising;
(a) guide means mounted on the truck and defining a longitudinally elongated guide path extending inwardly from said one edge,
(b) slide means slidably mounted on said guide means for longitudinal movement along said guide path between a first position and a second position,
(c) elevator means including load engaging means for releasably engaging a palletized load unit, said elevator means being slidably mounted on said slide means for movement of said load engaging means between a lowered position and an elevated position,
(d) drive means including means for driving said slide means between said first and second positions and means for driving said elevator means between said elevated position and said lowered position,
(e) said first position of said slide means being one in which said elevator means is located outwardly from said one edge so as to be free to move between said elevated position and said lowered position, said second position of said slide means being one in which said load engaging means of said elevator means is disposed above said load supporting bed so as to be lowered onto or raised from said load supporting bed as required,
(f) wherein said load engaging means includes,
(i) a first pair of arms each having an inner end pivotally mounted on said elevator means for movement between a first position extending generally vertically from said pivotally mounted inner ends to a second position projecting laterally from said pivotably mounted inner ends, said first arms projecting laterally from a first side of said elevator means and being spaced from one another a distance to permit movement between said first and second positions when a palletized load is located therebetween,
(ii) a second pair of arms each having an inner end pivotally mounted on said elevator means for movement from a first position extending generally vertically from said pivotally mounted inner ends to a second position projecting laterally from said pivotably mounted inner ends, said second pair of arms extending laterally from a second side of said elevator means opposite said first side and being spaced from one another a distance to permit movement between said first and second positions when a palletized load is located therebetween.

13. In a truck having a load supporting bed on which palletized loads are to be loaded over one edge thereof, a pallet loader comprising:
(a) guide means mounted on the truck and defining a longitudinally elongated guide path extending inwardly from said one edge,
(b) slide means slidably mounted on said guide means for longitudinal movement along said guide path between a first position and a second position,
(c) elevator means including load engaging means for releasably engaging a palletized load unit, said elevator means being slidably mounted on said slide means for movement of said load engaging means between a lowered position and an elevated position,
(d) drive means including means for driving said slide means between said first and second positions and means for driving said elevator means between said elevated position and said lowered position, (e) said first position of said slide means being one in which said elevator means is located outwardly from said one edge so as to be free to move between said elevated position and said lowered position, said second position of said slide means being one in which said load engaging means of said elevator means is disposed above said load supporting bed so as to be lowered onto or raised from said load supporting bed as required, (f) said guide means is located centrally of the width of the load supporting bed whereby load supporting compartments are located one on either side of said guide path, (g) wherein said load engaging means includes;
  (i) a first pair of arms each having an inner end pivotally mounted on said elevator means for movement between a first position extending generally vertically from said pivotally mounted inner ends to a second position projecting laterally from said pivotably mounted inner ends, said first arms projecting laterally from a first side of said elevator means and being spaced from one another a distance to permit movement between said first and second positions when a palletized load is located therebetween,
  (ii) a second pair of arms each having an inner end pivotally mounted on said elevator means for movement from a first position extending generally vertically from said pivotally mounted inner ends to a second position projecting laterally from said pivotally mounted inner ends, said second pair of arms extending laterally fom a second side of said elevator means opposite said first said side and being spaced from one another a distance to permit movement between said first and second positions when a palletized load is located therebetween.

* * * * *